United States Patent [19]

Srivastava

[11] 4,360,825
[45] Nov. 23, 1982

[54] VERTICAL DRIVE GENERATOR AND HORIZONTAL RATE GATE GENERATOR FOR A TELEVISION RECEIVER

[75] Inventor: Gopal K. Srivastava, Buffalo Grove, Ill.

[73] Assignee: Zenith Radio Corporation, Glenview, Ill.

[21] Appl. No.: 219,086

[22] Filed: Dec. 22, 1980

[51] Int. Cl.³ .......................... H04N 9/46; H04N 5/06
[52] U.S. Cl. ...................................... 358/20; 358/150; 358/176
[58] Field of Search ................... 358/150, 154, 20, 27, 358/176, 178

[56] References Cited

U.S. PATENT DOCUMENTS 3,777,063 12/1973 Meacham ............................. 358/150
4,149,179 4/1979 Wilcox ................................. 358/20

Primary Examiner—Richard Murray

[57] ABSTRACT

A vertical drive generator and a horizontal gating generator are described which time-share circuitry common to both generators to provide vertical drive pulses and horizontal gating pulses for use in a television receiver. The vertical drive generator converts variable width vertical rate pulses to constant width vertical drive pulses in a manner such that the duration of each drive pulse is determined by a digital counter. In the interval between the generation of successive vertical drive pulses, the counter is reset to provide timing control for the gating generator. In the preferred embodiment, the latter generator develops AGC gating pulses and burst gating pulses at selected times and for selected durations.

10 Claims, 7 Drawing Figures

VERTICAL DRIVE GENERATOR + FLYBACK RESET GENERATOR

BURST GATE GENERATOR

AGC GATE GENERATOR

VERTICAL DRIVE GENERATOR AND HORIZONTAL RATE GATE GENERATOR FOR A TELEVISION RECEIVER

BACKGROUND OF THE INVENTION

The present invention relates generally to improvements in television receivers. It is particularly directed to a system for generating vertical drive pulses for use in controlling the vertical scan of a television receiver, and for generating horizontal rate gating pulses of the type used to gate AGC (automatic gain control) circuitry.

In some television receivers, a so-called vertical countdown circuit is employed to generate a vertical drive pulse after counting a predetermined number of horizontal rate clock pulses which are synchronized with incoming horizontal sync pulses. When the composite video signal is derived from a standard broadcast signal having 525 lines per frame (NTSC), the countdown circuit is put in a "standard" mode for generating vertical pulses at the conventional rate. However, when the composite video signal is derived from a non-standard signal source, such as a video camera, the number of horizontal lines per frame may be higher or lower than the standard rate. In that case, the vertical countdown circuit goes into a "non-standard" mode in order to generate vertical drive pulses at a rate which synchronizes the receiver's raster with the non-standard signal source.

Typically, when a non-standard composite video signal is received, the vertical drive pulses developed by the vertical countdown circuit have a relatively short duration which can vary from field to field. When a standard video signal is received, vertical drive pulses of a relatively longer and more constant duration are generated. Because good interlace is difficult to achieve with vertical drive pulses whose widths are changing, the latter pulses are commonly applied to a monostable multivibrator to convert them to vertical pulses of a relatively constant width.

The problem with the arrangement described immediately above is that the vertical countdown circuit is normally constructed on an integrated circuit chip, and the monostable multivibrator requires an extra pin on the chip to access a discrete RC network which controls the duration of the multivibrator's output pulses. In addition to the expense associated with the extra pin and the discrete RC network, the RC network also includes the usual component tolerances which result in a corresponding, undesirable tolerance in the duration of the multivibrator's output pulses.

To provide vertical drive pulses of a more constant width, digital circuitry whose timing is more accurate and consistent than conventional passive circuitry can be used. However, the inclusion of additional, relatively complex digital circuitry is difficult to justify from an economic point of view unless such circuitry can also be used to provide other functions in addition to the generation of constant width vertical drive pulses.

The present invention not only provides the requisite constant width vertical drive pulses with digital circuitry, but also time-shares portions of its circuitry to generate horizontal rate gating pulses for use in gating AGC circuitry, burst detection circuitry and the like.

OBJECTS OF THE INVENTION

It is a general object of the invention provide an improved vertical drive generator.

It is a more specific object of the invention to provide a vertical drive generator which time-shares portions of its circuitry with a horizontal rate gating generator.

It is another object of the invention to provide a vertical drive generator for converting variable width vertical rate pulses to constant width vertical drive pulses, and to provide a horizontal rate gating generator which develops gating pulses which are accurately timed by portions of the vertical drive generator.

BRIEF DESCRIPTION OF THE FIGURES

The objects stated above and other objects of the invention are set forth with greater particularity in the detailed description below and in the accompanying drawings, of which.

DESCRIPTION OF THE PREFERRED EMBODIMENT

Figure 1:
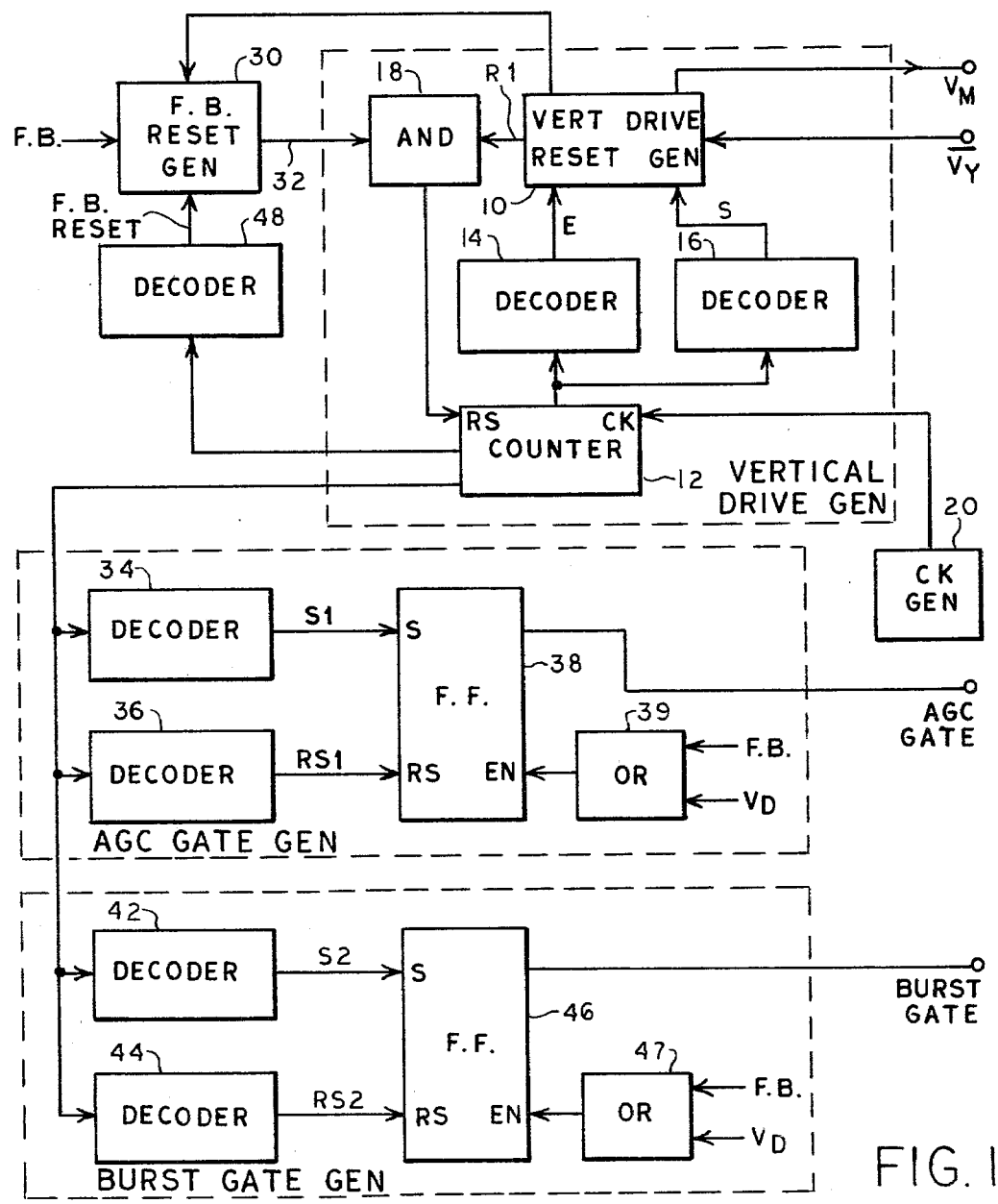
FIG. 1 shows, in block diagram form, a vertical drive generator combined with a gate generator in accordance with the invention.

Referring now to FIG. 1, a combined vertical drive generator and a horizontal rate gate generator are shown which employ some circuitry which is common to both generators. The vertical drive generator includes a vertical drive reset generator 10, a counter 12, decoders 14 and 16, and an AND gate 18. In general, this vertical drive generator receives vertical rate input pulses Vy and clock signals from a clock generator 20 for developing constant width vertical drive output pulses Vm. The remainder of the illustrated circuitry is primarily devoted to the gate generator and is described hereinafter.

In the type of television receiver with which the present invention is particularly useful, a so-called vertical countdown circuit is employed which counts a given number of clock signal pulses which are locked to incoming horizontal sync pulses, and then generates a vertical drive pulse. When the incoming sync pulses are derived from a standard NTSC broadcast signal, the countdown circuit is enabled in a "standard" mode in which it counts a standard number of clock pulses before generating a vertical drive pulse. When the incoming horizontal sync pulses are derived from a non-standard signal source, such as a video camera, the number of horizontal sync pulses per frame may vary from the standard NTSC value. In that case, the countdown circuit is switched to a "non-standard" mode. In the latter mode, vertical drive pulses may be derived by conventionally integrating the six field sync pulses which occur during each vertical interval. However, the resultant drive pulses tend to vary in width.

To generate a constant width vertical drive pulse for use in the non-standard mode, those variable width pulses are preferably applied to the illustrated vertical drive generator for conversion to constant width vertical drive pulses. In FIG. 1, $\overline{Vy}$ represents the compliment of the variable width vertical pulses which are converted to constant width vertical drive pulses identified as Vm.

Figure 2:
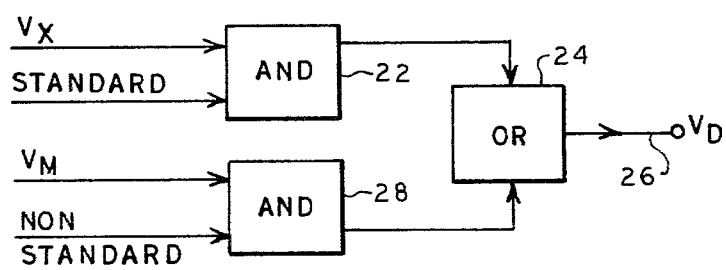
FIG. 2 illustrates how the vertical drive pulses generated by the embodiment of FIG. 1 may be ORed with vertical drive pulses generated by other circuitry in a television receiver.

Referring briefly to FIG. 2, a receiver which includes such a vertical countdown circuit generates vertical drive pulses Vx and a "standard" signal when the receiver is in the standard mode. The latter signal and the drive pulses Vx may be applied to an AND gate 22 for coupling the pulses Vx through an OR gate 24 to an output lead 26. The signal at the lead 26 is identified as Vd and may be applied to a conventional vertical ramp generator for developing the receiver's vertical scan drive.

When the receiver is in a non-standard mode, a "non-standard" signal may be developed and applied as one input to an AND gate 28, the other input thereto being the pulses Vm developed by the vertical drive generator of FIG. 1. When the non-standard signal is present, the pulses Vm are coupled via the OR gate 24 to the output lead 26. Thus, the vertical drive output pulses Vd constitute vertical rate pulses Vx (generated by the vertical countdown circuit) when the receiver is in its standard mode, and the output pulses Vd constitute the vertical drive pulses Vm generated by the circuitry of FIG. 1 when the receiver is in the non-standard mode.

Referring again to FIG. 1, the variable width vertical rate pulses $\overline{Vy}$ are applied to the vertical drive reset generator 10. When the leading edge of a pulse $\overline{Vy}$ is received, the vertical rate drive pulse $\overline{Vm}$ is initiated by the reset generator 10 and a complementary pulse Vm is initiated for temporarily disabling a flyback reset generator 30. The latter generator responds by developing a high level output on the lead 32 which is coupled to the AND gate 18. The F.B. reset generator 30, being primarily a part of the gate generator, remains disabled until after the generation of the pulse Vm has been completed.

Figure 3:
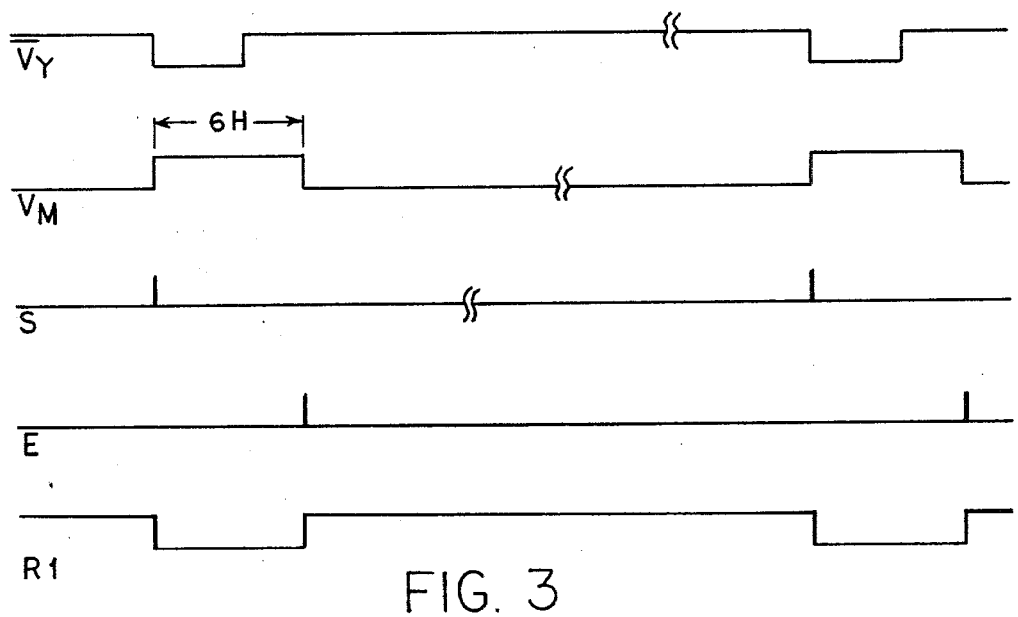
FIG. 3 shows various vertical rate waveforms useful in describing the operation of the embodiment of FIG. 1.

In response to the leading edge of the pulse $\overline{Vy}$, the reset generator 10 also develops a high level reset pulse R1 which is applied to the AND gate 18. The time relationship among the reset pulse R1, the input pulse $\overline{Vy}$, and the vertical drive pulse Vm is shown in FIG. 3.

Because both inputs to the AND gate 18 are now high, the reset pulse R1 is applied to the counter 12 to reset it to an initial count of zero. The decoder 16 senses the zero count state of the counter 12 and applies a start signal S (see FIG. 3) to the reset generator 10. In response to the start signal, the generator 10 drives its reset signal R1 low, wherefore the AND gate 18 applies a low level signal to the counter 12. Consequently, the counter begins counting clock pulses received from the clock generator 20.

The clock generator may conventionally generate clock pulses of any suitable frequency, such as about one megahertz. For the embodiment described herein, however, it is preferable that the frequency of the pulses generated by the clock generator 20 be 1.007 megahertz.

When the counter 12 has counted 380 of the 1.007 megahertz clock pulses, the decoder 14 senses that occurrence and transmits an end signal E (see FIG. 3) to the reset generator 10. The reset generator 10 then terminates its output pulse Vm, $\overline{Vm}$ goes high to enable the flyback reset generator 30, the reset output of the generator 10 goes high, and the flyback reset generator 30 holds the lead 32 at a high level. Consequently, the AND gate 18 resets the counter 12.

When the next incoming vertical rate pulse $\overline{Vy}$ occurs, the vertical drive generator goes through the sequence described above for generating another vertical drive pulse Vm. Hence, pulses Vm having a constant width are developed, irrespective of variations in the width of the incoming pulses $\overline{Vy}$. In the case where the clock generator 20 develops clock signals at a frequency of 1.007 megahertz and the decoder 14 is adapted to sense when the counter 12 has reached a count of 380, each drive pulse Vm has a width of 6H, where H is equal to one horizontal line interval.

Turning now to the gate generating function of the circuitry shown in FIG. 1, it will be understood that most television receivers require at least one horizontal rate gating signal. In both black and white and color receivers, an AGC gating signal is used for enabling a detector which senses sync tips for generating an AGC signal. In color receivers, a burst gating signal is also used to enable a detector which senses the 3.58 megahertz burst signal. The embodiment of FIG. 1 is adapted to generate both a burst gating signal and an AGC gating signal using some of the same circuitry which is included in the vertical drive generator.

Figure 4:
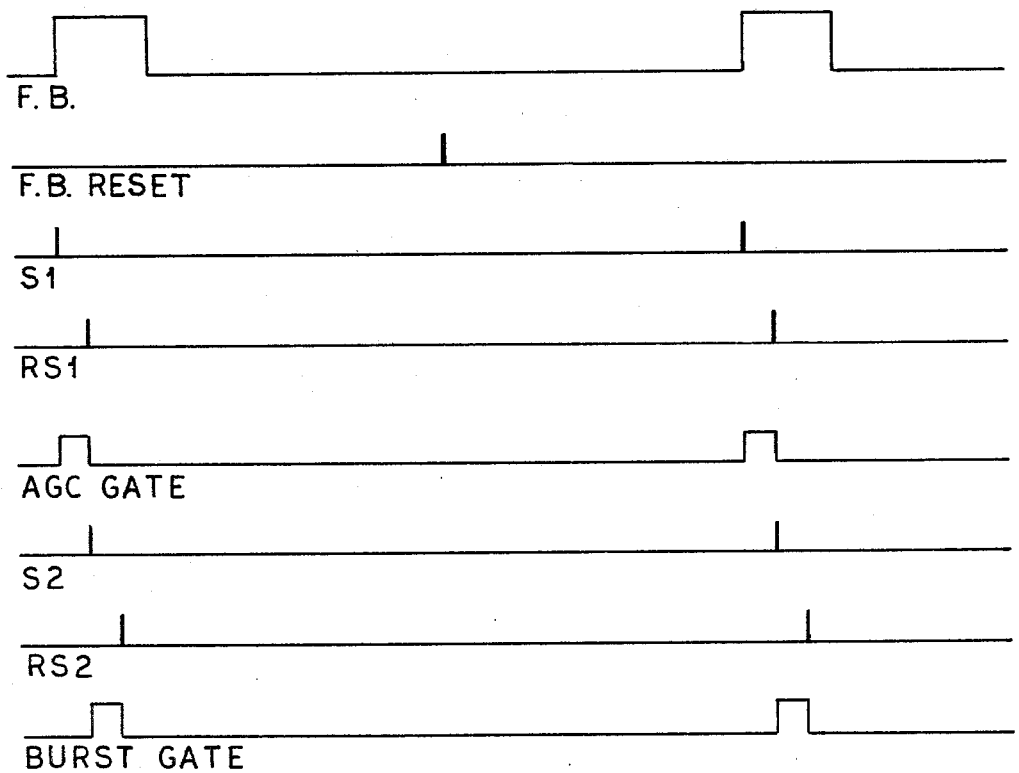
FIG. 4 shows various horizontal rate waveforms useful in describing the operation of the embodiment of FIG. 1.

To generate an AGC gate, the circuitry of FIG. 1 includes a pair of decoders 34 and 36 which sense the count of the counter 12 for setting and resetting a flip-flop 38 at the proper times. The output of the flip-flop 38 constitutes an AGC gate which is shown in FIG. 4.

To ensure that the AGC gate is developed in proper timed relationship with a flyback pulse, the flyback reset generator 30 acts as a timing signal generator for causing the counter 12 to begin counting anew from an initial count upon receipt of each flyback pulse which occurs subsequent to the termination of a vertical drive pulse Vm. When the counter 12 reaches a first predetermined count above that initial count, the AGC gate generator initiates an AGC gate pulse and, when the counter reaches a second higher predetermined count, the AGC gate generator terminates the AGC gate pulse. Thus, the AGC gate generator develops a gate pulse of a predetermined duration for each flyback pulse which occurs subsequent to the termination of a vertical drive pulse Vm.

It will be recalled that the counter 12 is reset when a vertical drive pulse Vm terminates. In the intervals between the generation of successive pulses Vm, the reset generator 30 receives flyback pulses and is in its active mode. When one such flyback pulse is received, the reset generator 30 drives its output lead 32 low for causing the counter 12 to begin counting anew from zero. The decoder 34 senses when the counter 12 then reaches a first predetermined count, and sets the flip-flop 38 via a set signal S1, thereby initiating the AGC gate pulse (see FIG. 4). When the counter 12 reaches a second, higher, predetermined count, the decoder 36 senses that occurrence and applies a reset signal RS1 (FIG. 4) to the flip-flop 38 to terminate the AGC gate. Thus, an AGC gate is developed which starts when the counter reaches its first predetermined count and which terminates when the counter reaches its second predetermined count.

In the preferred case in which the pulses from the clock generator 20 have a frequency of 1.007 megahertz, the decoder 34 preferably causes the AGC gate pulse to begin when the counter 12 reaches a count of approximately one, and the decoder 36 preferably causes the AGC gate pulse to terminate when the counter attains a count of approximately six.

To ensure that the AGC gate generator is enabled at the proper time, an OR gate 39 receives flyback pulses and vertical drive pulses $\overline{Vd}$ (FIG. 2) to enable the flip-flop 38 only during receipt of a flyback pulse which occurs subsequent to the generation of a vertical drive pulse Vm.

To provide a burst gate signal, a burst gate generator is included which comprises decoders 42 and 44 for sensing the state of the counter 12 and for setting and resetting a flip-flop 46. The decoder 42 is selected to generate a set pulse S2 (FIG. 4) in response to the counter 12 reaching a third predetermined count higher than the count on which the AGC gate pulse was initiated. The flip-flop 46 responds to the set pulse S2 by initiating a burst gate pulse. The decoder 44 is selected to generate a reset pulse RS2 in response to the counter 12 reaching a fourth, higher, predetermined count so that the flip-flop 46 terminates the burst gate pulse. In the case where the clock generator 20 develops pulses at a frequency of 1.007 megahertz, the decoder 42 is preferably selected to generate its set pulse S2 on a count of approximately five, and the decoder 44 is selected to generate its reset pulse on a count of approximately ten. In this manner, a burst gate is developed whose duration is equal to the period associated with five clock pulses.

To ensure that the flip-flop 46 is not enabled at an improper time, an OR gate 47 may be included which receives flyback pulses and drive pulses $\overline{Vd}$. The output of the OR gate 47 enables the flip-flop 46 on flyback pulses which occur subsequent to the termination of the vertical drive pulse Vm.

After the AGC and burst gates have been developed, it is necessary to reset the counter 12. This is effected by another decoder 48 which senses when the counter 12 has counted beyond the counts which activated the AGC gate generator and the burst gate generator. Preferably, the decoder 48 senses when the counter 12 has counted 32 of the 1.007 megahertz clock pulses and develops, at that time, a signal identified as F.B. reset (FIG. 4). In response to the latter signal, the flyback reset generator 30 drives its output lead 32 high for resetting the counter 12. Such reset continues until the generator 30 receives the next flyback pulse, whereupon the generator 30 drives its output lead 32 low for causing the counter 12 to begin counting clock pulses. The AGC and burst gate generators then develop additional AGC and burst gates in the manner described above. This cycle repeats continuously for each received flyback pulse until another vertical rate pulse $\overline{Vy}$ is received. When the latter event occurs, the reset generator 30 is disabled, and the reset generator 10 is enabled to generate another pulse $\overline{Vm}$. Then the AGC and burst gate generators are enabled for generating additional AGC and burst gates.

Figure 5:
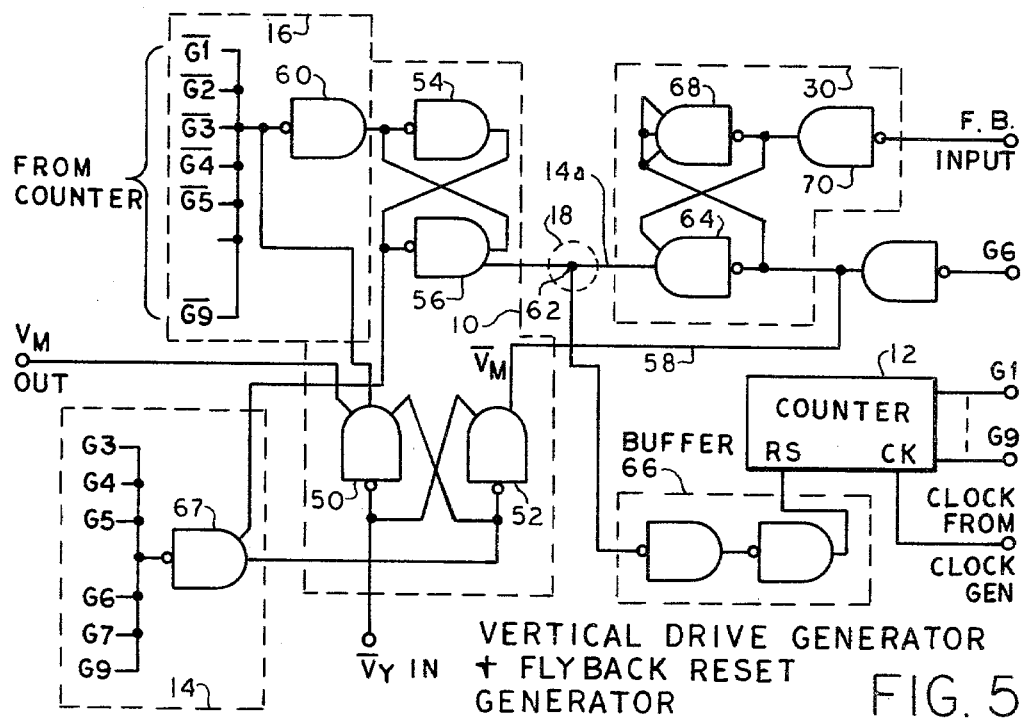
FIG. 5 is a detailed circuit diagram of the vertical drive generator shown in FIG. 1.

Turning now to FIG. 5, details are shown of a preferred embodiment of the vertical drive generator and the flyback reset generator. As shown, the vertical drive reset generator 10 includes a pair of gates 50 and 52 which are interconnected to form a flip-flop, and another pair of gates 54 and 56 interconnected to form another flip-flop. When a pulse Vy is applied to the gate 50, its output goes high to initiate the vertical drive pulse Vm. Simultaneously, the gate 52 develops the complimentary output Vm on a lead 58 for temporarily disabling the flyback reset generator 30.

The decoder 16 includes a gate 60 which receives the $\overline{G}_1$ through $\overline{G}_9$ outputs of the counter 12 in addition to the output of the gate 50. The output of the gate 60 is applied to the input of the gate 54.

The flyback reset generator 30 includes gates 64, 68 and 70, the gate 70 being adapted to receive incoming flyback pulses, and the gates 64 and 68 being interconnected to form another flip-flop. The $\overline{Vm}$ output of the gate 52 is applied to the input of the gate 64.

When Vm initially goes high and $\overline{Vm}$ goes low, the output of gate 64 is driven high. Prior to this, the output of gate 56 had been high to enable the generation of burst and AGC gates. The outputs of gates 56 and 64 are applied to a node 62 which represents (in I²L technology) the AND gate 18. With the outputs of gates 56 and 64 both high, the node 62 applies a high level counter reset signal to the reset input of the counter 12 via a buffer 66. Thus, the counter 12 is reset to a count of zero, which state is sensed by the gate 60. At that time, the output of the gate 60 goes low to reverse the state of the flip-flop gates 54–56 to a low output. This low output is received by the node 62 for releasing the reset on the counter 12 so that the counter may begin counting clock pulses.

The decoder 14 includes a gate 67 which receives the $G_3$–$G_7$ and $G_9$ outputs of the counter 12. Hence, when the counter reaches a count of 380 (corresponding to 6H), the output of the gate 67 goes low to latch the flip-flop gates 50–52 in a state wherein the drive pulse Vm goes low and its compliment, $\overline{Vm}$ goes high. The output of gate 67 also latches the flip-flop gates 54 and 56 in a state wherein the output of gate 56 is high. The output of gate 50 which is now low ensures that the output of gate 56 remains high until the next $\overline{Vy}$ pulse occurs.

Flip-flop gates 64 and 68 have already been latched in a state wherein the output of gate 64 is high. Therefore, the node 62 goes high to apply a reset signal to the reset input of the counter 12 via the buffer 66.

It will be recalled that the flip-flop gates 64 and 68 were enabled when the signal $\overline{Vm}$ went high so that, when the next flyback pulse is received, the output of the gate 70 goes low to latch the flip-flop gates 64–68 in a state wherein the output of the gate 64 is held low. Hence, the node 62 applies a low level signal to the counter 12 via the buffer 66 so as to start the counter counting again.

Figure 6:
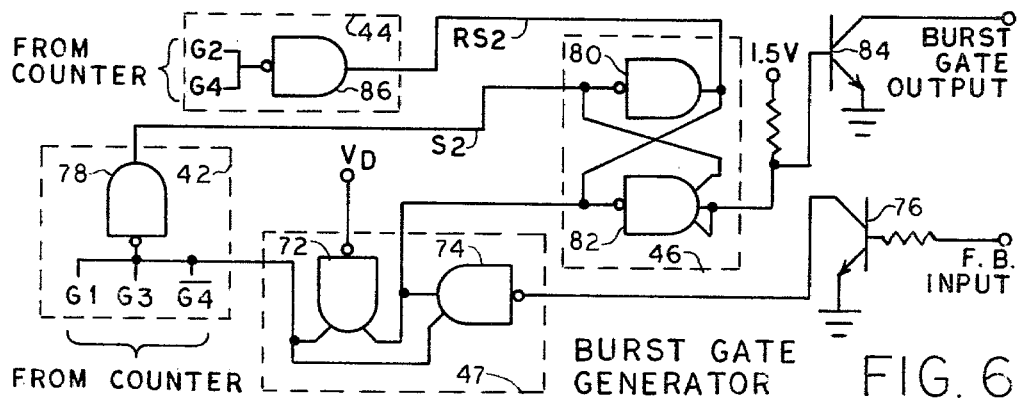
FIG. 6 is a detailed circuit diagram of the burst gate generator shown in FIG. 1.

Referring now to FIG. 6, a preferred embodiment is shown of the burst gate generator 40. Once again, the illustrated circuitry is of the I²L type, wherefore the OR gate 47 is actually constructed of a pair of NAND gates 72 and 74, the former of which receives the vertical drive pulse $\overline{Vd}$ instead of its complement Vd which was shown in FIG. 1. Also, the gate 74 receives a complimentary flyback pulse which is inverted by a transistor 76. This arrangement provides the function of the OR gate 47 shown in FIG. 1 in that it enables the flip-flop 46 only when the flyback pulses occur after the vertical drive pulse.

As shown, the decoder 42 includes a gate 78 which receives the $G_1$, $G_3$ and $\overline{G}_4$ outputs of the counter 12.

When those outputs indicate that the counter has counted to five, the gate 78 applies a set signal S2 to the flip-flop 46. The flip-flop 46 includes a pair of gates 80 and 82 which are interconnected so that, when the signal S2 goes low, the output of the gate 82 also goes low to turn off an output transistor 84 and thereby initiate the burst gate.

The decoder 44 includes a gate 86 receiving the $G_2$ and $G_4$ outputs of the counter 12 for developing the reset signal RS2 when the counter reaches a count of 10. That reset signal resets the state of the flip-flop gates 80–82 such that the output of the latter gate goes high. Hence, the burst gate is terminated.

Figure 7:
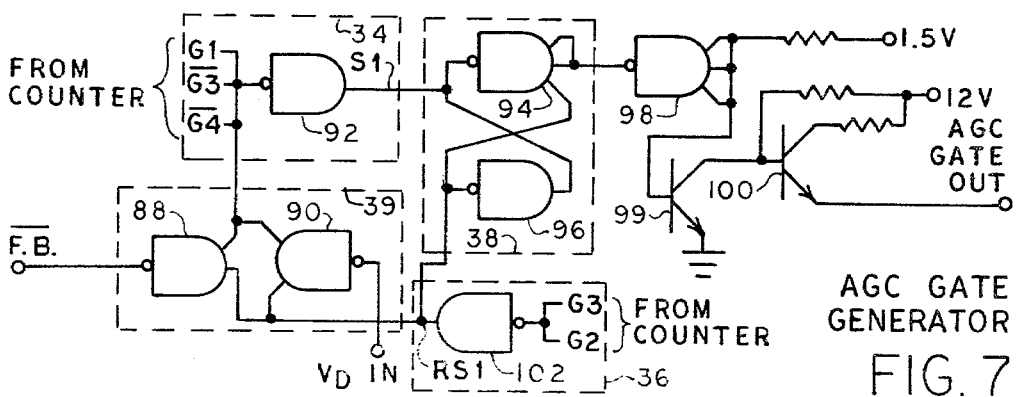
FIG. 7 is a detailed circuit diagram of the AGC gate generator shown in FIG. 1.

The AGC gate generator is illustrated in more detail in FIG. 7. As shown, the OR gate 39 is implemented as a pair of NAND gates 88 and 90 receiving an inverted flyback pulse ($\overline{F.B.}$) and a vertical drive pulse Vd. These gates operate to enable the burst gate generator during flyback pulses which occur subsequent to the vertical drive pulse.

The decoder 34 includes a gate 92 receiving the $G_1$, $\overline{G_3}$ and $\overline{G_4}$ outputs of the counter for developing a set signal S1 when the counter reaches a count of 1. In response, the flip-flop 38, comprising gates 94 and 96, applies a high level signal to an inverter 98. The low level output of the inverter 98 is coupled to a pair of driver transistors 99 and 100 to develop the AGC gate output signal.

The decoder 36 includes a gate 102 receiving the $G_2$ and $G_3$ outputs of the counter for developing a reset signal RS1 when the counter attains a count of six. The latter reset signal resets the flip-flop 38 so as to terminate the AGC gate pulse.

With the arrangement described above which combines a vertical drive generator with a horizontal rate gating generator, the use of a digitally controlled vertical drive generator is made economically feasible. The principal savings occurs due to the fact that the counter 12 is time-shared by the vertical drive generator and the horizontal rate gating generator.

Another advantage of the illustrated embodiment is that the occurrence of the gating signals are precisely controlled in relation to the occurrence of the vertical drive pulse. In addition, the timing of the gating signals is easily changed to meet the requirements of a particular receiver merely by changing the counts on which the gating decoders set and reset their associated flip-flops.

Although the invention has been described in terms of a preferred embodiment, it will be obvious to those skilled in the art that many modifications and alterations thereto may be made without departing from the invention. For example, the invention may be altered for use in a television receiver which does not include a vertical countdown circuit, even though the preferred embodiment has been described in terms of such an application. Accordingly, all such modifications and alterations are deemed to be within the spirit and scope of the invention as defined by the appended claims.

What is claimed is:

1. In a television receiver which develops flyback pulses and variable width vertical rate pulses, and which includes a clock generator and signal processing circuitry requiring gating at a horizontal line rate, a vertical drive generator for converting the vertical rate pulses to constant width vertical drive pulses, combined with a gate generator for gating the signal processing circuitry at a horizontal line rate, comprising:

vertical drive means responsive to a variable width vertical rate pulse for initiating a vertical rate drive pulse and for generating a counter-enabling signal;

a counter receiving clock pulses from the clock generator and responsive to the counter-enabling signal for counting the clock pulses;

decoding means responsive to said counter reaching a given count for disabling said vertical drive means such that the vertical drive pulse is terminated, whereby the width of the vertical drive pulse corresponds to the interval required for the counter to reach said given count, irrespective of the width of the vertical rate pulse;

a timing signal generator receiving flyback pulses and responsive to the termination of the vertical drive pulse for causing the counter to begin counting anew from an initial count upon receipt of each flyback pulse which occurs subsequent to the termination of the vertical drive pulse, at least one gating means adapted to be enabled subsequent to the termination of the vertical drive pulse and responsive to the counter reaching a first predetermined count above its initial count for initiating a gate pulse, and responsive to the counter reaching a second predetermined count above the first count for terminating the gate pulse so that the gate generator develops a gate pulse of a predetermined duration for each flyback pulse which occurs subsequent to the termination of the vertical drive pulse.

2. A generator as set forth in claim 1 wherein said gating means includes a first decoder responsive to the counter reaching said first predetermined count for generating a first control signal, a second decoder responsive to the counter reaching said second predetermined count for generating a second control signal, and a flip-flop responsive to the first control signal for initiating the gate pulse and responsive to the second control signal for terminating the gate pulse.

3. A generator as set forth in claim 2 wherein the clock generator develops clock pulses at a frequency of approximately 1 megahertz, wherein said gating means constitutes an AGC gate generator, wherein said first decoder generates its control signal in response to the counter reaching a count of approximately one, and wherein said second decoder generates its control signal in response to the counter reaching a count of approximately six, whereby an AGC gate pulse is developed which has a duration of approximately five cycles of the clock pulses.

4. A generator as set forth in claim 2 further including an additional gating means which includes a third decoder responsive to the counter reaching a third predetermined count for generating a third control signal, a fourth decoder responsive to the counter reaching a fourth predetermined count for generating a fourth control signal, and another flip-flop responsive to the third control signal for initiating an additional gate pulse and responsive to the fourth control signal for terminating the latter pulse.

5. A generator as set forth in claim 4 wherein the clock generator develops clock pulses at a frequency of approximately one megahertz, wherein said additional gating means constitutes a burst gate generator, wherein said third decoder generates its control signal in response to the counter reaching a count of approximately five, and wherein said fourth decoder generates its control signal in response to the counter reaching a count of approximately ten, whereby a burst gate pulse is developed which has a duration of approximately five cycles of the clock pulses.

6. In a television receiver which develops flyback pulses and variable width vertical rate pulses, and which includes a clock generator and signal processing circuitry requiring AGC and burst gates at a horizontal line rate, a vertical drive generator for converting the vertical rate pulses to constant width vertical drive pulses, combined with a gate generator for gating the signal processing circuitry at a horizontal line rate, comprising:

a counter for counting clock pulses developed by the clock generator;

vertical drive generating means for enabling the counter in response to a variable width vertical rate pulse, for disabling the counter after it has attained a given count, and for generating a constant width vertical drive pulse whose duration corresponds to the time required for the counter to attain said given count;

reset timing means for enabling the counter to begin counting anew from an initial count subsequent to the generation of the vertical drive pulse;

an AGC gate generator adapted to be enabled during flyback pulse intervals which occur subsequent to the vertical drive pulse, and responsive to the counter counting to first and second predetermined counts higher than said initial count for generating an AGC gate pulse whose duration corresponds to the time during which said counter counts from said first to said second predetermined counts;

a burst gate generator, adapted to be enabled during flyback pulse intervals which occur subsequent to the vertical drive pulse, and responsive to the counter counting to third and fourth predetermined counts higher than said initial count for generating a burst gate pulse whose duration corresponds to the time during which said counter counts from said third to said fourth predetermined counts; and means responsive to said counter attaining a counter higher than said fourth predetermined count for resetting said timing means such that the counter is reset to its initial count.

7. A vertical drive and gate generator as set forth in claim 6 wherein said reset timing means is disabled by said vertical drive generating means during generation of the vertical drive pulse, and is responsive to flyback pulse occurring subsequent to the generation of the vertical drive pulse for enabling said counter.

8. A generator as set forth in claim 6 wherein the clock generator develops clock pulses at a frequency of 1.007 megahertz, and wherein said vertical drive generating means is adapted to generate a vertical drive pulse whose duration corresponds to a count of 380 clock pulses.

9. A generator as set forth in claim 8 wherein said AGC gate generator is adapted to develop an AGC gate pulse whose duration corresponds to a count of approximately five clock pulses, and wherein said first gate generator is adapted to develop a burst gate pulse whose duration corresponds to a count of approximately five clock pulses.

10. A generator as set forth in claim 9 wherein said AGC gate generator includes first and second decoders responsive, respectively, to the counter reaching counts of one and six for developing set and reset outputs, and a flip-flop responsive to the set and reset outputs for developing the AGC gate pulse, and wherein said burst gate generator includes third and fourth decoders responsive, respectively, to the counter reaching counts of five and ten for developing further set and reset outputs, and a further flip-flop responsive to the latter set and reset outputs for developing the burst gate pulse.

* * * * *